(12) United States Patent
Kanamaru et al.

(10) Patent No.: US 9,234,328 B2
(45) Date of Patent: Jan. 12, 2016

(54) UPPER SLEWING BODY FOR CONSTRUCTION MACHINE

(71) Applicant: KOBELCO CONSTRUCTION MACHINERY CO., LTD., Hiroshima-shi (JP)

(72) Inventors: Hiroshi Kanamaru, Hiroshima (JP); Kaoru Adachi, Hiroshima (JP); Masakazu Ozaki, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/592,197

(22) Filed: Jan. 8, 2015

(65) Prior Publication Data

US 2015/0204049 A1 Jul. 23, 2015

(30) Foreign Application Priority Data

Jan. 17, 2014 (JP) ................................ 2014-006500

(51) Int. Cl.
*E02F 9/08* (2006.01)
*E02F 9/00* (2006.01)
(Continued)

(52) U.S. Cl.
CPC ................ *E02F 9/0858* (2013.01); *E02F 3/32* (2013.01); *E02F 9/006* (2013.01); *E02F 9/0808* (2013.01); *E02F 9/0891* (2013.01); *E02F 9/121* (2013.01); *B60R 2011/004* (2013.01)

(58) Field of Classification Search
CPC ....... E02F 9/0858; E02F 9/0891; E02F 9/121; E02F 9/006; E02F 9/0808; E02F 3/32; B60R 2011/004

See application file for complete search history.

(56) References Cited

U.S. PATENT DOCUMENTS 6,134,816 A * 10/2000 Murakami .............. E02F 3/382
220/562
7,722,308 B2 * 5/2010 Sakitani .................. E02F 9/006
414/680

(Continued)

FOREIGN PATENT DOCUMENTS

EP 1 878 835 A2 1/2008
EP 1 878 835 A3 1/2008

(Continued)

OTHER PUBLICATIONS

Extended European Search Report issued Jun. 18, 2015 in Patent Application No. 15151049.2.

*Primary Examiner* — Paul N Dickson
*Assistant Examiner* — Darlene P Condra
(74) *Attorney, Agent, or Firm* — Oblon, McClelland, Maier & Neustadt, L.L.P.

(57) ABSTRACT

A boom foot pin is attached to a pair of vertical plates so as to be able to be pulled out along an axial direction of the boom foot pin. A housing box has a box main body with a housing space inside and an opening/closing lid configured to allow an opening region of the box main body to be opened and closed. The box main body is disposed on the right of the right vertical plate in a state where the boom foot pin is placed opposite the housing space with reference to the opening region in a side view in which the upper slewing body is viewed along an axial direction and the box main body is shaped to open the boom foot pin in the axial direction. The opening/closing lid is rotated to a position where the opening region is closed to lie at a position where the opening/closing lid overlaps the boom foot pin in the side view, and is rotated to a position where the opening region is opened to lie at a position where the boom foot pin is opened in the axial direction.

7 Claims, 10 Drawing Sheets

(51) Int. Cl.
*E02F 3/32* (2006.01)
*E02F 9/12* (2006.01)
*B60R 11/00* (2006.01)

(56) References Cited

U.S. PATENT DOCUMENTS

| | | | |
|---|---|---|---|
| 2008/0014070 A1 | 1/2008 | Sakitani et al. | |
| 2012/0174566 A1 | 7/2012 | Yamashita et al. | |
| 2013/0071295 A1* | 3/2013 | Terakawa | E02F 9/0858 422/168 |
| 2014/0000975 A1 | 1/2014 | Ueda | |
| 2015/0016932 A1 | 1/2015 | Azuma et al. | |

FOREIGN PATENT DOCUMENTS

| | | |
|---|---|---|
| EP | 2 479 393 A1 | 7/2012 |
| EP | 2 578 832 A1 | 4/2013 |
| EP | 2 677 088 A1 | 12/2013 |
| JP | 2004-52226 | 2/2004 |
| JP | 2004-52226 A | 2/2004 |
| JP | 2010-188764 A | 9/2010 |
| JP | 2011-58247 A | 3/2011 |
| JP | 5257117 | 8/2013 |
| WO | WO 2013/137169 A1 | 9/2013 |
| WO | WO 2013/137169 A9 | 9/2013 |

* cited by examiner

UPPER SLEWING BODY FOR CONSTRUCTION MACHINE

TECHNICAL FIELD

The present invention relates to an upper slewing body for a construction machine.

BACKGROUND ART

A construction machine provided with an upper slewing body which includes a housing box in which various tools and the like are housed is conventionally known (see, for example, Japanese Unexamined Patent Publication No. 2004-052226 [hereinafter referred to as Patent Literature 1] and Japanese Patent No. 5257117 [hereinafter referred to as Patent Literature 2]).

A construction machine described in Patent Literature 1 includes a tank with an expanded portion and a housing box removably mounted on the expanded portion of the tank.

A construction machine described in Patent Literature 2 includes a toolbox having an opening/closing lid with a first step recessed therein and an auxiliary step plate removably attached to the opening/closing lid and serving as a second step. Thus, the toolbox can be utilized as a rising-and-falling step.

During a boom assembly operation at a factory and during a boom maintenance operation at a construction site, a working space needs to be secured for lateral removal of a boom foot pin from the construction machine.

In the construction machine described in Patent Literature 1, the housing box is disposed to overlap the boom foot pin in a side view. Thus, temporarily removing the housing box from the upper slewing body provides a working space.

In the construction machine described in Patent Literature 2, the auxiliary step plate is disposed to overlap the boom foot pin in a side view. Thus, temporarily removing the auxiliary step plate from the upper slewing body provides a working space.

However, in the construction machine described in Patent Literature 1, a whole of the housing box needs to be removed from the upper slewing body, thus disadvantageously increasing a workload on an operator.

In the construction machine described in Patent Literature 2, only removal of the auxiliary step plate from the opening/closing lid allows the working space to be secured, thus reducing the workload compared to removal of the whole of the toolbox. However, the operation of removing the component is still needed, resulting in a large number of work steps. Moreover, in the construction machine described in Patent Literature 2, the toolbox has a small height enough to prevent the toolbox from overlapping the boom foot pin in a side view. Thus, a housing space for the toolbox is small in size.

SUMMARY OF INVENTION

An object of the present invention is to provide an upper slewing body that enables a working space for installing and removing a boom foot pin without removal of a housing box to be secured.

To accomplish the object, the present invention provides an upper slewing body to be provided on a lower traveling body of a construction machine so as to be able to slew, the upper slewing body including a bottom plate to be provided on the lower traveling body so as to be able to slew, a pair of vertical plates stood on the bottom plate and extending in a front-rear direction, the vertical plates being opposite to each other in a left-right direction, a boom foot pin attached to the pair of vertical plates so as to straddle the pair of vertical plates, the boom foot pin being attached to the pair of vertical plates so as to be able to be pulled out along an axial direction of the boom foot pin, a boom supported by the boom foot pin so as to be able to rotate with respect to the pair of vertical plates, and a housing box including: a box main body having a housing space formed inside, the housing space including an opening region so as to be open, the box main body allowing an object to be moved in and out of the housing space through the opening region; and an opening/closing lid configured to allow the opening region of the box main body to be opened and closed, wherein the box main body is disposed on a side of one of the pair of vertical plates opposite to the other vertical plate in a state where the boom foot pin is placed opposite the housing space with reference to the opening region in a side view in which the upper slewing body is viewed along the axial direction, and the box main body is shaped to open the boom foot pin in the axial direction, the opening/closing lid is attached to the box main body so as to be able to rotate with respect to the box main body between a closed position where the opening region is closed and an open position where the opening region is open, and the opening/closing lid is rotated to the closed position to lie at a position where the opening/closing lid overlaps the boom foot pin in the side view, and is rotated to the open position to lie at a position where the boom foot pin is opened in the axial direction.

According to the present invention, when the opening/closing lid closes the opening region of the box main body that is open toward the boom foot pin side (the opening/closing lid is rotated to the closed position), the opening/closing lid overlaps the boom foot pin in the side view. This, in combination with utilization of a space in the opening/closing lid, allows a large housing space to be secured in the housing box. On the other hand, when the opening region of the box main body is opened (the opening/closing lid is rotated to the open position), the opening/closing lid and the box main body do not overlap the boom foot pin (the boom foot pin is opened in the axial direction) in the side view. A working space for lateral removal of the boom foot pin from the construction machine can be secured simply by rotating the opening/closing lid in an opening direction without removing a whole of the housing box from the upper slewing body. Thus, a workload can be reduced.

DESCRIPTION OF EMBODIMENTS

Figure 1:
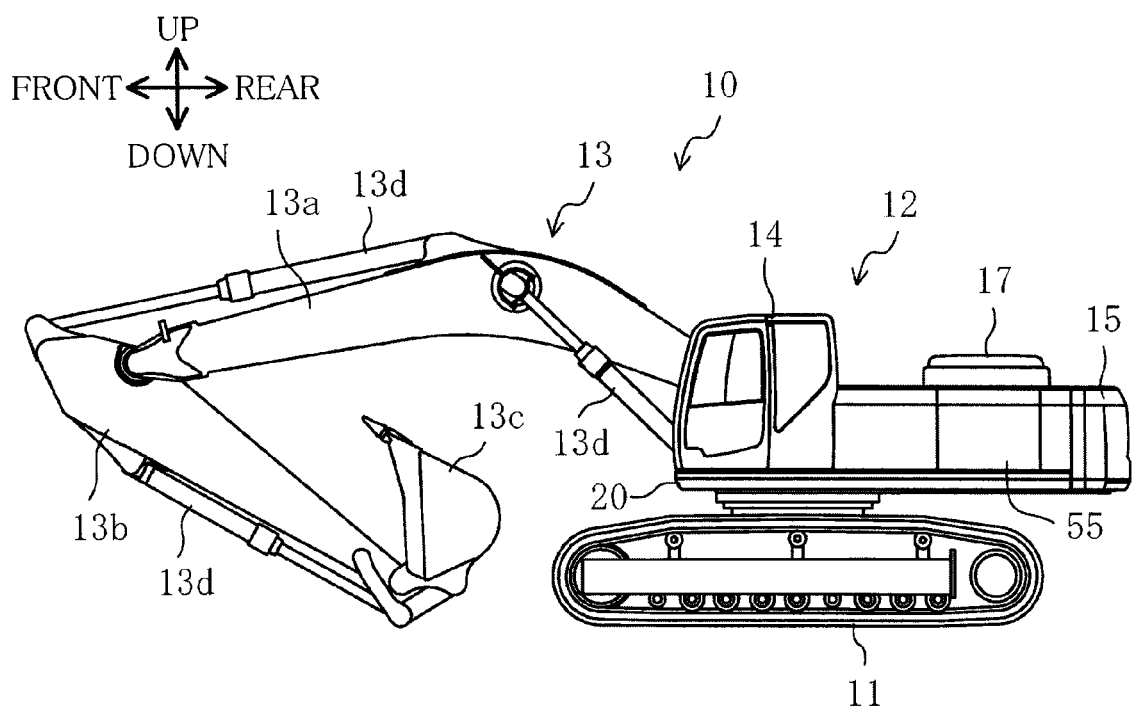
FIG. 1 is a side view illustrating a general configuration of a construction machine according to a first embodiment of the present invention.

Embodiments of the present invention will be described below with reference to the attached drawings. The embodiments described below are specific examples of the present invention and are not intended to limit the technical scope of the present invention.

In the drawings, an up-down direction, a front-rear direction, and a left-right direction are shown by arrows. The following description is based on the directions shown by the arrows unless otherwise specified.

First Embodiment

Figure 2:
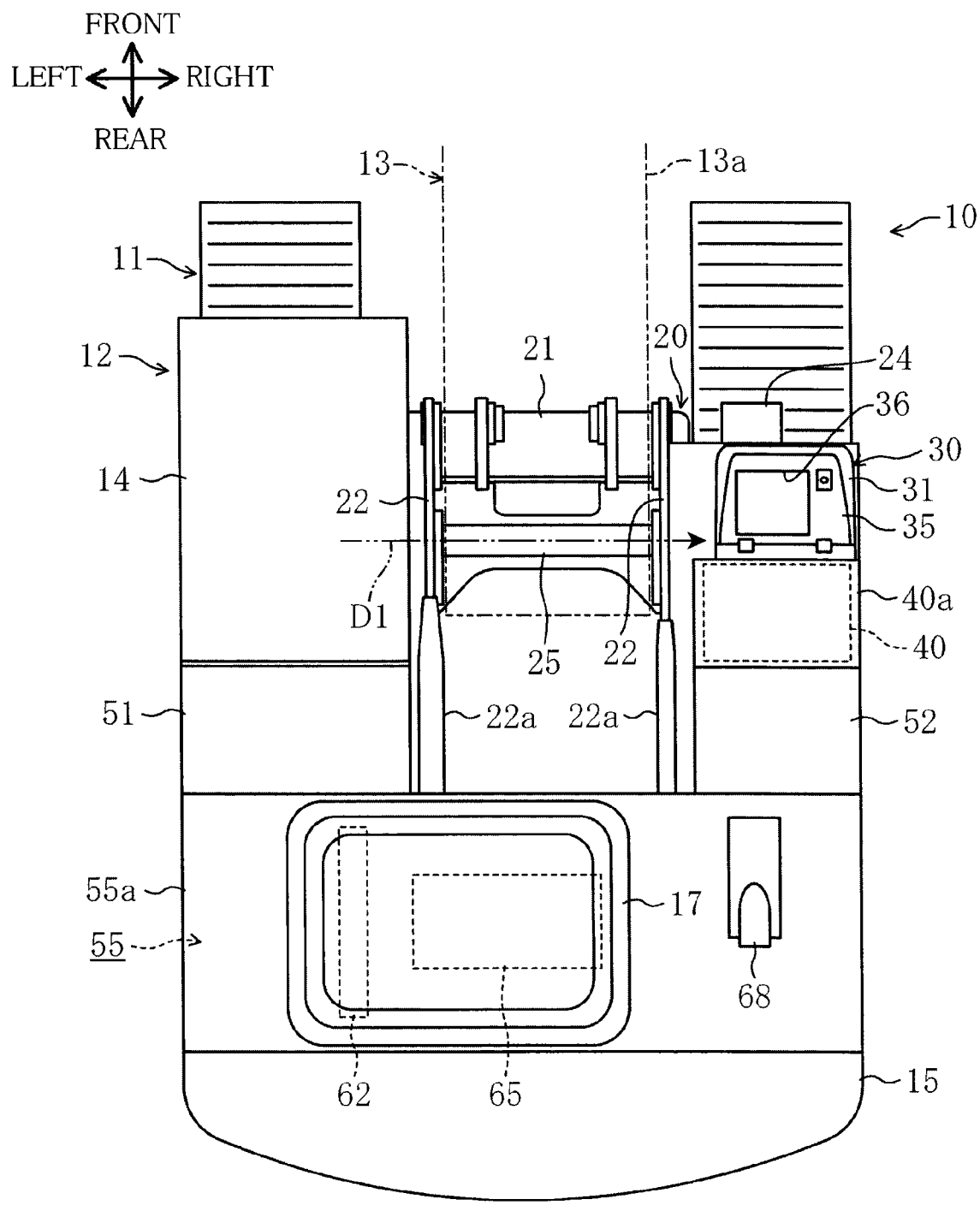
FIG. 2 is a plan view illustrating a general configuration of the construction machine shown in FIG. 1.
Figure 3:
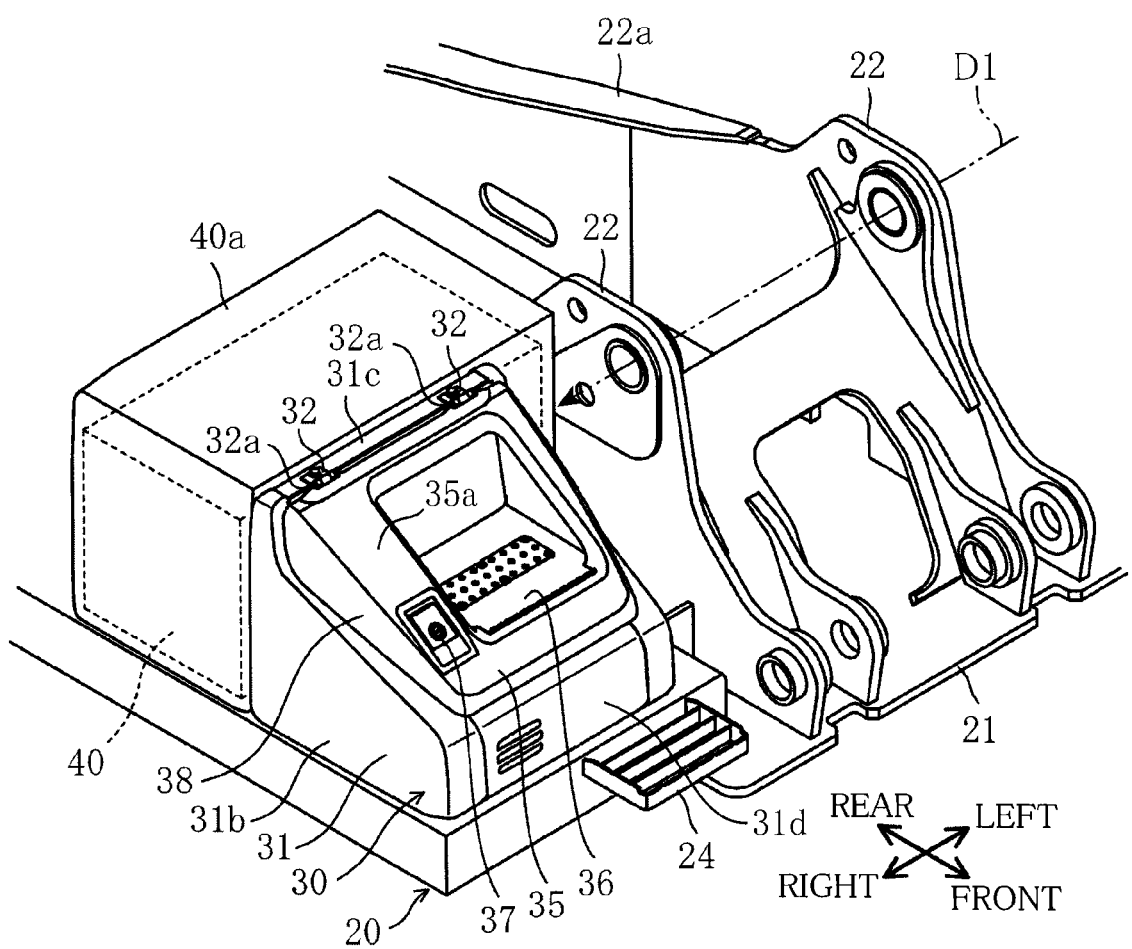
FIG. 3 is a perspective view illustrating a state where an opening/closing lid of a housing box shown in FIG. 2 is closed.

FIG. 1 is a side view illustrating a general configuration of a construction machine according to a first embodiment. FIG. 2 is a plan view of the construction machine in FIG. 1.

A construction machine 10 is a hydraulic shovel including a crawler-like lower traveling body 11 and an upper slewing body 12 provided on the lower traveling body 11 so as to be able to slew.

The upper slewing body 12 includes an upper frame 20 provided on the lower traveling body 11 so as to be able to slew, and a boom foot pin 25, an attachment 13, a cab 14, fuel tank 51, a housing box 30, a reducing agent tank 40, a hydraulic oil tank 52, a counterweight 15, and a machine room 55 which are respectively provided on the upper frame 20.

The upper frame 20 has a bottom plate 21 provided on the lower traveling body 11 so as to be able to slew, and a pair of vertical plates 22 stood on the bottom plate 21 and extending in the front-rear direction, the vertical plates 22 being opposite to each other in the left-right direction. The pair of vertical plates 22 is provided in an intermediate portion of the bottom plate 21 in the left-right direction. A band-like reinforcing plate 22a is joined to an upper end surface of rear portion of each of the vertical plates 22, which thus each have a generally T-like cross-sectional shape.

The boom foot pin 25 is attached to front portions of the pair of vertical plates 22 so as to straddle the pair of vertical plates 22. Furthermore, the boom foot pin 25 is attached to the pair of vertical plates 22 so as to be able to be pulled out from the pair of vertical plates 22 along an axial direction D1 of the boom foot pin 25. In the first embodiment, the axis of the boom foot pin 25 is disposed parallel to the left-right direction, and the cab 14 is provided on the left of the left vertical plate 22. Thus, the axial direction D1 of the boom foot pin 25 (pullout direction) corresponds to a direction from a left side toward a right side.

The attachment 13 includes a boom 13a having a base end portion supported by the boom foot pin 25 so as to be able to rotate with respect to the pair of vertical plates 22, an arm 13b having a base end portion attached to a leading end side of the boom 13a so as to be able to rotate and a bucket 13c attached to a leading end side of the arm 13b so as to be able to rotate. Furthermore, the attachment 13 includes a hydraulic cylinder 13d that rotates and drives the boom 13a with respect to the upper frame 20, a hydraulic cylinder 13d that rotates and drives the arm 13b with respect to the boom 13a, and a hydraulic cylinder 13d that rotates and drives the bucket 13c with respect to the arm 13b. The attachment 13 performs a rising-lowering operation and a stretching-contracting operation by extending and retracting the hydraulic cylinders 13d.

The cab 14 is provided on the left side of front portion of the upper frame 20 in order to define an operation space for an operator. The cab 14 includes an operator's seat, various operation apparatuses, and instruments.

The fuel tank 51 stores fuel for driving an engine 65 described below and is provided behind the cab 14.

The housing box 30, the reducing agent tank 40, and the hydraulic oil tank 52 are provided on the right side of front portion of the upper frame 20 (rightward of the right vertical plate 22) and arranged in this order from a front side. The upper frame 20 further includes a step tool 24 provided in front of the housing box 30. A specific configuration of the housing box 30 is described below.

The reducing agent tank 40 stores a liquid reducing agent (for example, urea aqueous) that serves to reduce NOx and the like contained in exhaust gas from the engine 65. The reducing agent tank 40 is covered by a decorative tank cover 40a. The liquid reducing agent stored in the reducing agent tank 40 is injected into an exhaust path by a reducing agent supply apparatus (not shown in the drawings).

The hydraulic oil tank 52 stores hydraulic oil for hydraulic control.

The machine room 55 is located in a rear portion of the upper slewing body 12 and extends in the left-right direction. The counterweight 15 is provided behind the machine room 55. Furthermore, the machine room 55 is covered with a machine room cover 55a. The machine room 55 is internally provided with an engine 65, a radiator 62, and the like. Exhaust gas discharged from the engine 65 is emitted to the outside of the machine room 55 via an exhaust pipe (not shown in the drawings) and a muffler 68. Over the machine room cover 55a, a bonnet 17 is provided which is opened and closed to allow the engine 65 and the like to be maintained.

As shown in FIG. 3 to FIG. 6, the housing box 30 has a box main body 31 with a housing space S inside, and an opening/closing lid 35 configured to allow an opening region 31a of the box main body 31 to be opened and closed. The housing space S has the opening region 31a so as to open, and the box main body 31 allows an object (for example, a tool) to be moved in and out of the housing space S through the opening region 31a. The opening/closing lid 35 is attached to the box main body 31 so as to be able to rotate with respect to the box main body between a closed position (see FIG. 4) where the opening region 31a is closed and an open position (see FIG. 6) where the opening region 31a is open.

Specifically, the box main body 31 includes a pair of sidewall portions 31b that are opposite to each other in the left-right direction, a hinge attachment portion 31c attached to the pair of sidewall portions 31b so as to straddle upper end portions of rear portions of the pair of sidewall portions 31b, and hinge members 32 attached to an upper surface of the hinge attachment portion 31c. The pair of sidewall portions 31b are coupled together by the hinge attachment portion 31c extending in the left-right direction. The hinge members 32 support the opening/closing lid 35 so as to allow the opening/closing lid 35 to be rotated between the closed position (see FIG. 4) and the open position (see FIG. 6). The hinge members 32 are attached to the hinge attachment portion 31c in a state where rotating shafts 32a (center of rotating) of the opening/closing lid 35 are positioned in front of a rear end of the box main body 31.

Upper edge portions of the pair of sidewall portions 31b each have a first portion 33c extending downward from a front edge of the hinge attachment portion 31c and a second portion 33d extending forward from a lower end of the first portion 33c, in a side view in which the upper slewing body 12 is viewed from a right side along the axial direction D1. The box main body 31 is disposed on the upper frame 20 so that the boom foot pin 25 is positioned in front of the first portion 33c and above the second portion, in the side view.

Furthermore, the box main body 31 includes a front wall portion 31d fixed to front end portions of the pair of sidewall portions 31b so as to straddle the front end portions of the pair of sidewall portions 31b. Upper end portions of the pair of sidewall portions 31b and front wall portion 31d of the box main body 31 are bent toward the inside of the box main body 31 with respect to lower parts of the upper end portions. Additionally, the opening region 31a is defined by the upper end portions of the pair of sidewall portions 31b, the upper end portion of the front wall portion 31d, and the front end portion of the hinge attachment portion 31c. In other words, the upper end portions of the pair of sidewall portions 31b, the upper end portion of the front wall portion 31d, and the hinge attachment portion 31c construct an opening side end portion 33 of the box main body 31 having an upper end surface in which the opening region 31a is formed. At a boom foot pin 25-side edge (upper edge) of the opening side end portion 33, recess portion 33a (see FIG. 6) is formed which is recessed in a direction away from the boom foot pin 25 (downward) in the side view. Thus, the boom foot pin 25 is opened in the axial direction D1.

As described above, the box main body 31 is disposed on a side of one (right vertical plate) of the pair of vertical plates 22 opposite to the other vertical plate (left vertical plate) in a state where the boom foot pin 25 is placed opposite (above) the housing space S with reference to the opening region 31a in the side view. Furthermore, the box main body 31 is shaped to open the boom foot pin 25 in the axial direction D1.

At a front edge portion of the opening side end portion 33, a seal member 34 is provided which is formed of a resin material, a rubber material, or the like. The seal member 34 is sandwiched and elastically deformed between the opening/closing lid 35 rotated to the closed position and the opening side end portion 33 to seal the gap between the box main body 31 and the opening/closing lid 35.

The base end portion of the opening/closing lid 35 is supported by the hinge attachment portion 31c of the box main body 31 via the hinge members 32 so as to be able to rotate. Thus, the opening/closing lid 35 can be opened and closed around the rotating shafts 32a of the hinge members 32.

Figure 4:
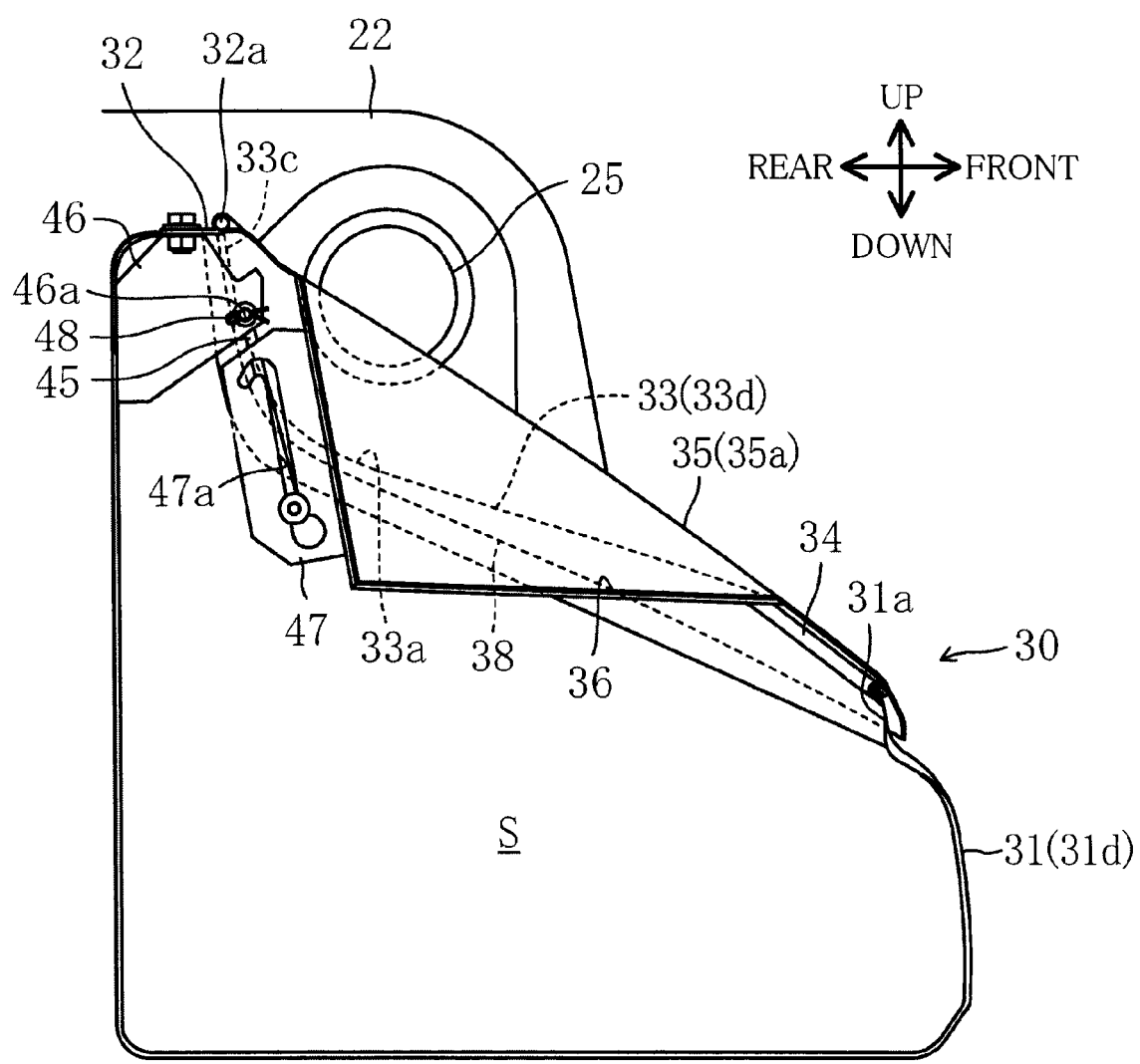
FIG. 4 is a side cross-sectional view illustrating a state where the opening/closing lid of the housing box shown in FIG. 2 is closed.
Figure 5:
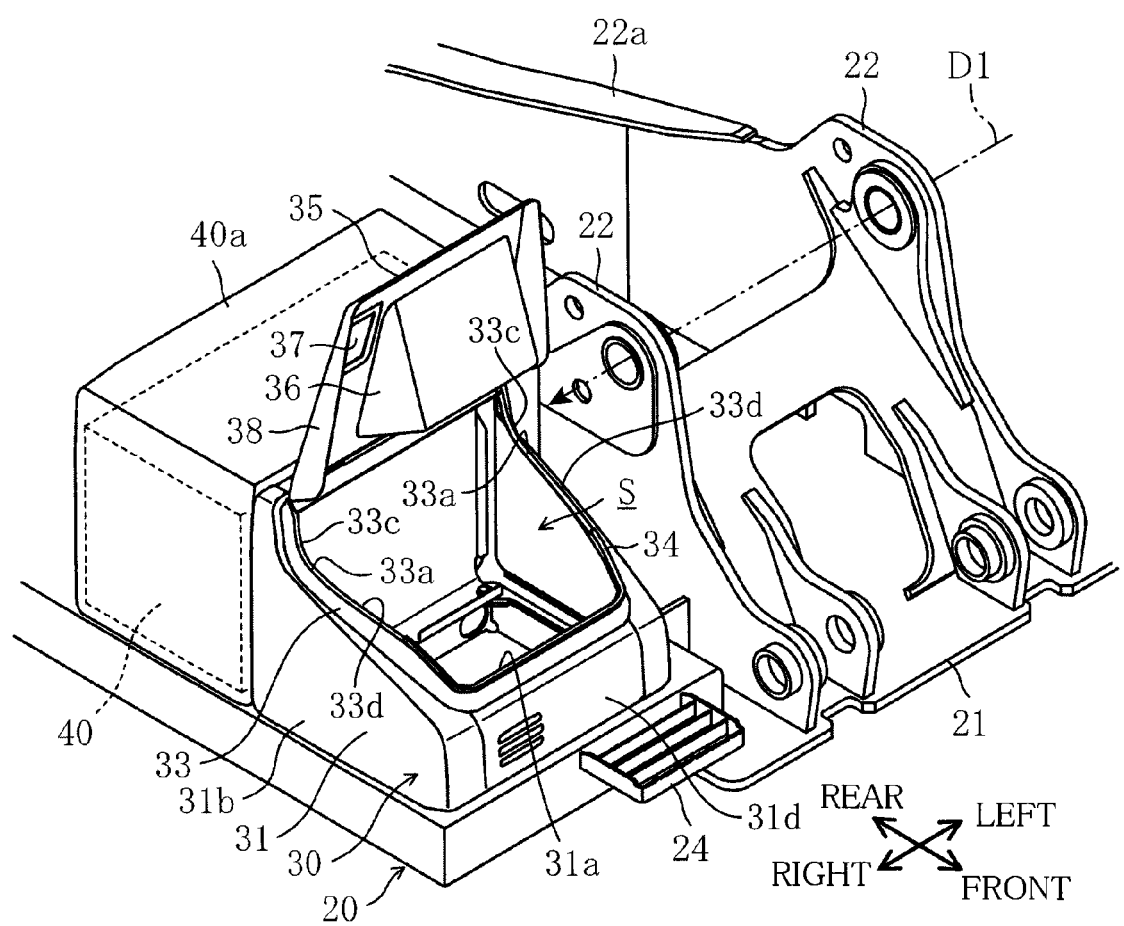
FIG. 5 is a perspective view illustrating a state where the opening/closing lid of the housing box shown in FIG. 2 is open.

Specifically, the opening/closing lid 35 is rotated to the closed position to lie at a position where the opening/closing lid 35 overlaps the boom foot pin 25 in the side view, as shown in FIG. 4. The opening/closing lid 35 is rotated to the open position to lie at a position where the boom foot pin 25 is opened in the axial direction D1, as shown in FIG. 6.

Figure 6:
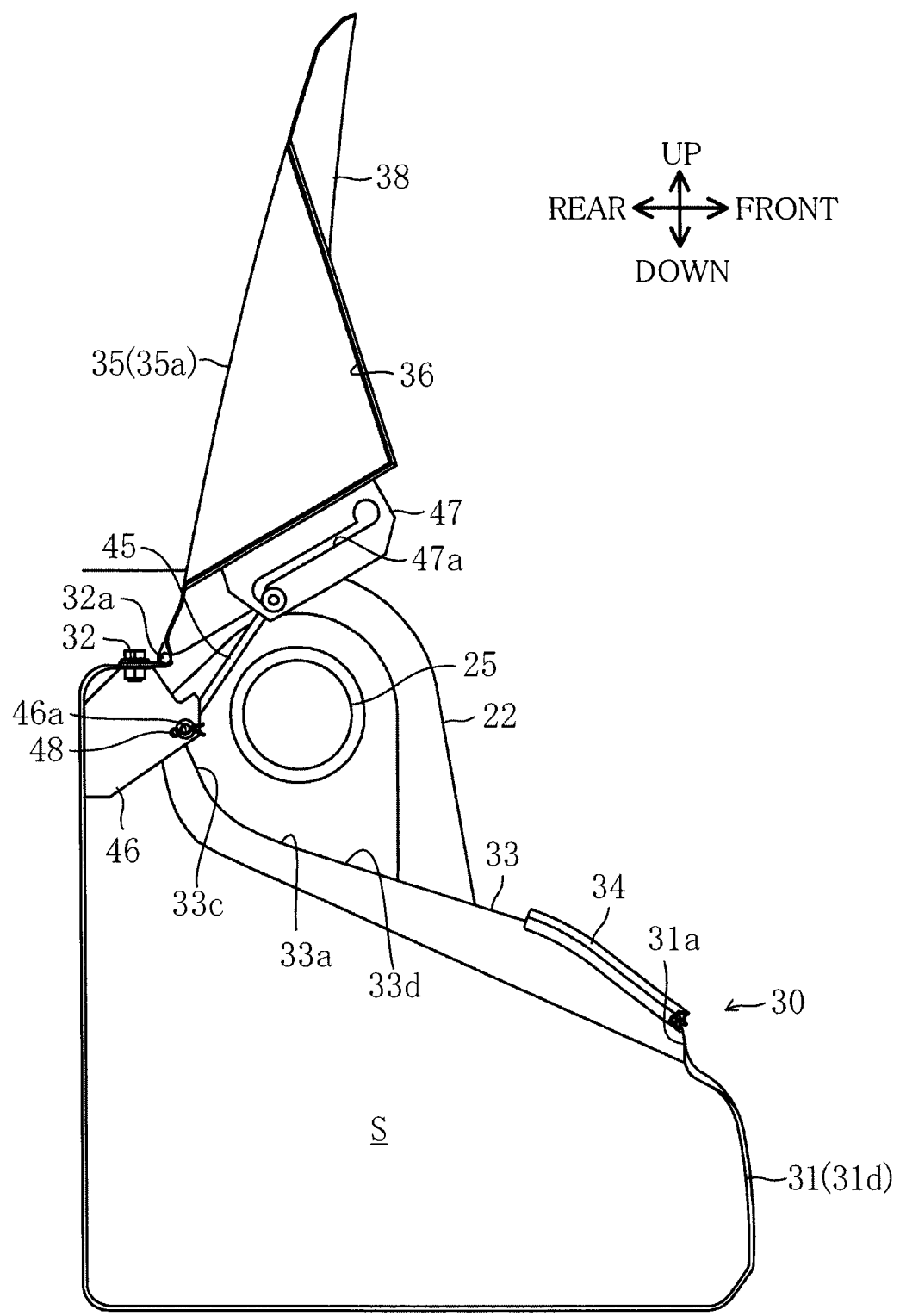
FIG. 6 is a side cross-sectional view illustrating a state where the opening/closing lid of the housing box shown in FIG. 2 is open.

More specifically, the opening/closing lid 35 according to the first embodiment is attached to the box main body 31 so as to be able to rotate between the closed position where the opening/closing lid 35 overlaps the boom foot pin 25 in the side view, as shown in FIG. 4, and the open position to which the opening/closing lid 35 is rotated upward from the closed position and where the opening/closing lid 35 is disposed above the boom foot pin 25 in the side view, as shown in FIG. 6.

In this regard, the housing box 30 further includes a main body side holding plate 46 attached to the box main body 31, a lid side holding plate 47 attached to the opening/closing lid 35, and a bar-like stay member 45 attached to the main body side holding plate 46 and the lid side holding plate 47. The main body side holding plate 46 is attached to a rear wall portion (reference numeral is omitted) of the box main body 31 in the housing space S. The rear wall portion of the box main body 31 is a wall portion fixed to a rear end portion of the pair of sidewall portions 31b so as to straddle the pair of sidewall portions 31b. On the other hand, the lid side holding plate 47 is attached to a surface (a back surface of a portion recessed for a step portion 36 described below) of the opening/closing lid 35 rotated to the closed position, the surface of the opening/closing lid 35 facing toward the housing space S side.

The stay member 45 is attached to both holding plates 46 and 47 so as to allow rotating of the opening/closing lid 35 between the closed position and the open position and to hold the opening/closing lid 35 in the open position as shown in FIG. 6 and further to regulate upward rotating of the opening/closing lid 35 beyond the open position. In other words, the opening/closing lid 35 and the box main body 31 are coupled together by the stay member 45. A base end portion and a leading end portion of the stay member 45 are each folded.

The base end portion of the stay member 45 inserted into an insertion hole 46a in the main body side holding plate 46 is retained by a retaining pin 48. Removal of the retaining pin 48 allows the base end portion of the stay member 45 to be removed from the main body side holding plate 46. On the other hand, the leading end portion of the stay member 45 is slidably inserted into a guide groove 47a formed in the lid side holding plate 47. A first end portion of the guide groove 47a has a size enough to allow the leading end portion of the stay member 45 to pass through in the left-right direction. Thus, the leading end portion of the stay member 45 can be removed from the lid side holding plate 47 by pulling the leading end portion of the stay member 45 out from the guide groove 47a through the first end portion of the guide groove 47a.

The guide groove 47a in the lid side holding plate 47 is shaped to be able to guide the leading end portion of the stay member 45 in conjunction with an opening and closing operation of the opening/closing lid 35 and to be able to engage with the leading end portion of the stay member 45 in a state where the opening/closing lid 35 is rotated to the open position. Engagement of the guide groove 47a with the leading end portion of the stay member 45 enables the stay member 45 to be fixed to hold the opening/closing lid 35 rotated to the open position while allowing regulation of upward rotating of the opening/closing lid 35 above the open position.

Figure 7:
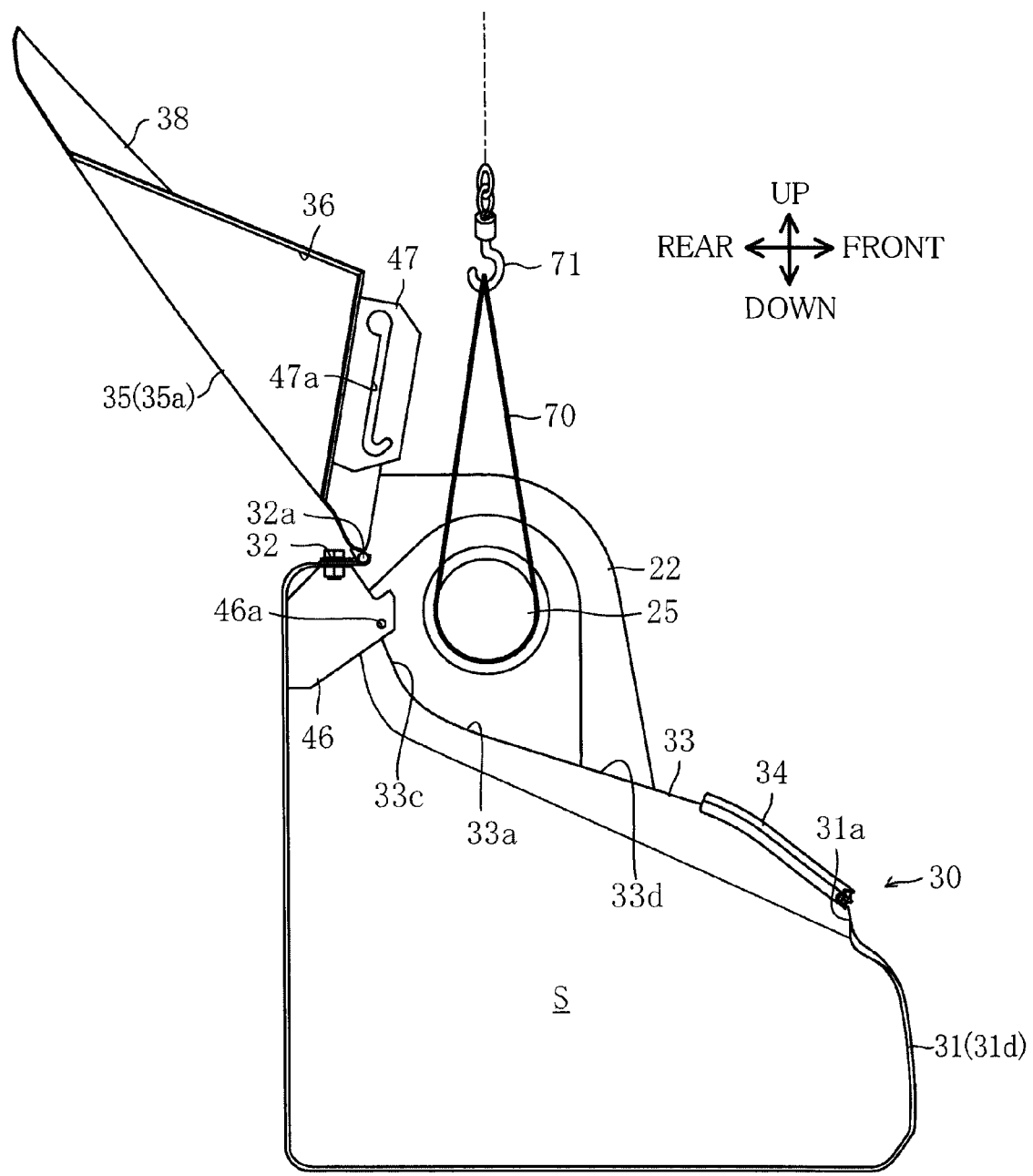
FIG. 7 is a side cross-sectional view illustrating a state where the opening/closing lid of the housing box shown in FIG. 2 is opened to a position where the opening/closing lid does not interfere with a hoisting member.

In this regard, in a state where the opening/closing lid 35 is rotated to the open position, a part of the opening/closing lid 35 is disposed above the boom foot pin 25 in the side view, as shown in FIG. 6. Thus, removal of the stay member 45 from at least one of the holding plates 46 and 47 releases the restriction of the opening/closing lid 35 performed by the stay member 45. Consequently, the opening/closing lid 35 can be rotated to a position (a position behind the open position) where the boom foot pin 25 is opened upward in the side view as shown in FIG. 7.

Furthermore, the opening/closing lid 35 has an inclined surface 35a that is inclined with respect to a horizontal plane and faces upward when the opening/closing lid 35 is rotated to the closed position (see FIG. 3 and FIG. 4) (the opening region 31a is closed). The inclined surface 35a is inclined such that the front portion of the opening/closing lid 35 is positioned lower than the rear portion of the opening/closing lid 35. Furthermore, the opening/closing lid 35 includes the step portion 36 formed by recessing a part of the inclined surface 35a toward the housing space S side so as to allow the operator to get on and off from the upper slewing body 12.

Thus, the operator can place, on the step portion 36, the operator's feet which have been rested on the step tool 24. The step portion 36 is provided approximately at a central position on the inclined surface 35*a* in the front-rear direction.

The opening/closing lid 35 includes a lid sidewall portion 38 that externally covers the opening side end portion 33 in a state where the opening/closing lid 35 is rotated to the closed position. Specifically, the lid sidewall portion 38 externally covers the upper end portions of the pair of sidewall portions 31*b* and the upper end portion of the front wall portion 31*d*, which are included in the opening side end portion 33. This allows rainwater and the like to be restrained from entering the housing space S.

In the first embodiment, an upper surface of the hinge attachment portion 31*c* of the box main body 31 is substantially flush with an upper surface of a tank cover 40*a* of the reducing agent tank 40. This enables the opening/closing lid 35 to be restrained from interfering with the tank cover 40*a* when the opening/closing lid 35 is opened. On the other hand, the center of rotating (rotating shafts 32*a*) of the opening/closing lid 35 is provided to lie in front of the rear end of the box main body 31 even when the tank cover 40*a* projects upward with respect to the box main body 31. Thus, the opening/closing lid 35 can be opened and closed, with the opening/closing lid 35 restrained from interfering with the tank cover 40*a*.

Furthermore, the housing box 30 further includes a lock mechanism 37 provided at a position on the right of the step portion 36 of the opening/closing lid 35 to lock the opening/closing lid 35 with respect to the box main body 31 in a state where the opening/closing lid 35 is rotated to the closed position.

As described above, when the opening region 31*a* of the box main body 31 is closed by the opening/closing lid 35, the opening/closing lid 35 overlaps the boom foot pin 25 (see FIG. 4) in the side view. Thus, the space in the opening/closing lid 35 is also utilized to enable a large housing space to be secured in the housing box 30. On the other hand, when the opening region 31*a* of the box main body 31 is opened, the opening/closing lid 35 and the box main body 31 do not overlap the boom foot pin 25 (the boom foot pin 25 is opened in the axial direction D1; see FIG. 6) in the side view. This enables a reduction in workload on the operator when the boom foot pin 25 is removed for maintenance or the like.

Specifically, when, in the closed position and open position of the opening/closing lid 35, the opening/closing lid 35 overlaps the boom foot pin 25 in the side view, the boom foot pin 25 interferes with the opening/closing lid 35. This prevents the boom foot pin 25 from being laterally pulled out from the construction machine 10. Thus, in this case, the box main body 31 or opening/closing lid 35 of the housing box 30 needs to be temporarily removed from the upper frame 20, increasing the workload on the operator.

In contrast, the first embodiment allows the boom foot pin 25 to be easily laterally pulled out and removed from the construction machine 10 in a state where the opening/closing lid 35 is rotated to the open position. Thus, the workload can be reduced.

According to the first embodiment, the recess portion 33*a* is formed at the boom foot pin 25 side edge of the box main body. Thus, the boom foot pin 25 can be opened in the axial direction D1. Consequently, a space for installation and removal of the boom foot pin 25 can be secured while the volume of the box main body 31 is maintained in the areas other than the recess portion 33*a*.

According to the first embodiment, rotating the opening/closing lid 35 to the closed position allows the opening side end portion 33 of the box main body 31 to be externally covered with the lid sidewall portion 38. This allows rainwater and the like to be restrained from entering the housing space S and improves the esthetic aspect of the present configuration.

According to the first embodiment, the center of rotating (rotating shafts 32*a*) of the opening/closing lid 35 attached via the hinge members 32 is positioned in front of the rear end of the box main body 31. Thus, for example, even when a decorative cover (for example, the tank cover 40*a*) is stood behind the housing box 30, the opening/closing lid 35 can be opened and closed while interference of the opening/closing lid 35 with the cover is suppressed. Furthermore, when the hinge attachment portion 31*c* and the decorative cover are designed to be continuous as in the first embodiment, the esthetic aspect of the present configuration is improved.

Moreover, the pair of sidewall portions 31*b* of the box main body 31 includes the first portion 33*c* and the second portion 33*d*, and the boom foot pin 25 is positioned in front of the first portion 33*c* and above the second portion 33*d* in the side view. Thus, the space for installation and removal of the boom foot pin 25 can be secured with the height of rear portion of the box main body 31 maintained.

When the boom foot pin 25 is conveyed by being hoisted by a hoisting member 70 of a crane 71, the hoisting member 70 of the crane 71 may interfere with the opening/closing lid 35 at the position of the opening/closing lid 35 shown in FIG. 6.

According to the first embodiment, the retaining pin 48 is taken out to remove the base end portion of the stay member 45 from the main body side holding plate 46 to release the restriction of the opening/closing lid 35 with respect to the box main body 31. Then, as shown in FIG. 7, the opening/closing lid 35 can be opened (rotated) to the position where the boom foot pin 25 is opened upward, in the side view.

Thus, it is suppress that the opening/closing lid 35 interferes with the hoisting member 70 when the boom foot pin 25 is conveyed by being hoisted by the hoisting member 70 of the crane 71 in order to allow an installation or removal operation for the boom foot pin 25 to be performed.

In the first embodiment, the stay member 45 is removed to release the restriction of the opening/closing lid 35 with respect to the box main body 31 to enable the opening/closing lid 35 to be opened to the position where the opening/closing lid 35 avoids interfering with the hoisting member 70. However, a mechanism that opens the boom foot pin 25 upward is not limited to the above-described mechanism. For example, the opening/closing lid 35 may be attached to the box main body 31 so that, in the open position, the opening/closing lid 35 is placed at a position where the boom foot pin 25 is opened upward and so that the opening/closing lid 35 rotated to the open position is held without removal of the stay member 45.

Second Embodiment

Figure 8:
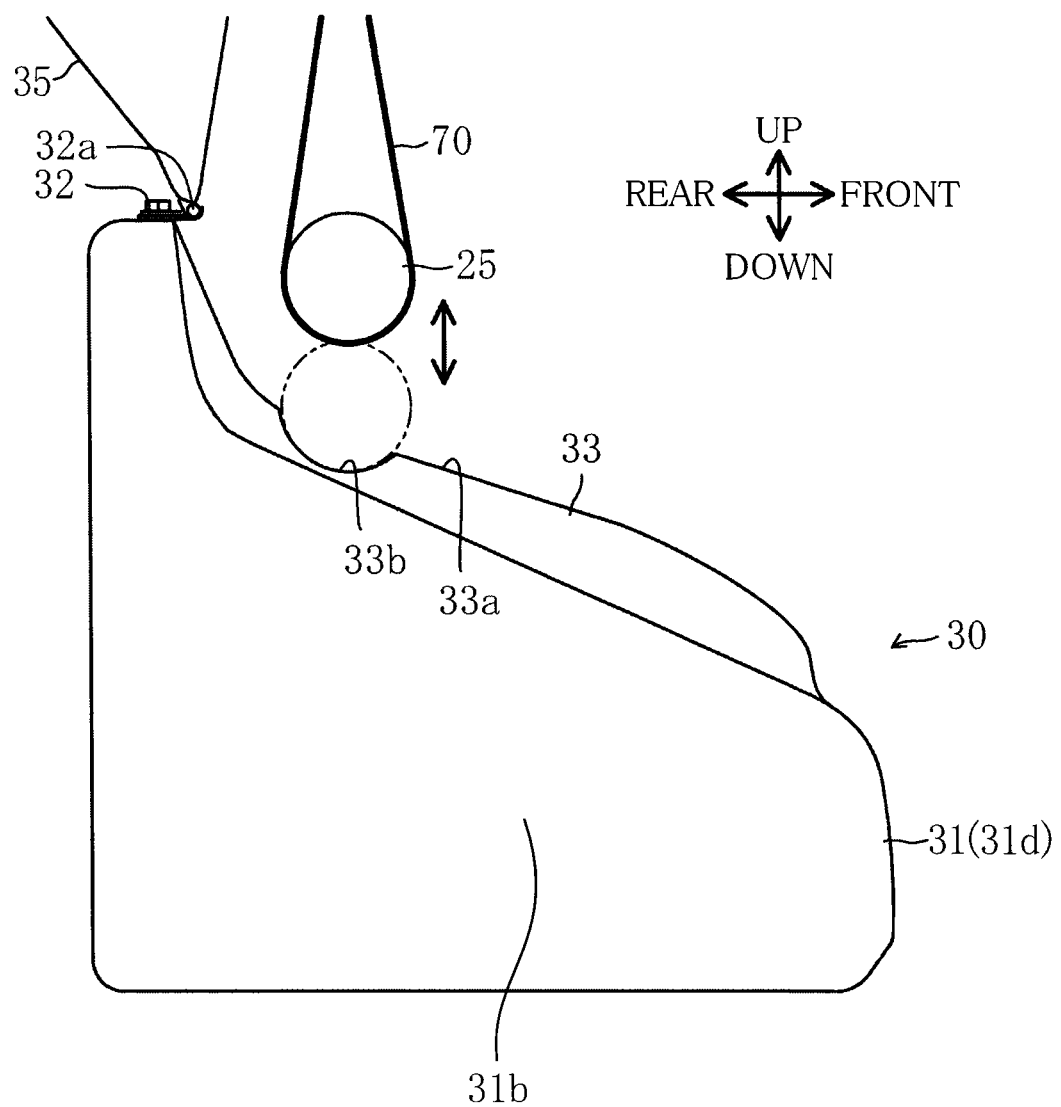
FIG. 8 is a side view illustrating a housing box according to a second embodiment of the present invention.

FIG. 8 is a side view illustrating a housing box according to a second embodiment of the present invention. The same components as the corresponding components in the first embodiment are denoted by the same reference numerals, and mainly differences from the first embodiment will be described.

As shown in FIG. 8, a box main body 31 includes an opening side end portion 33 having an end surface in which an opening region 31*a* is formed as in the first embodiment. At an upper edge of each of left-right opposite wall portions of the opening side end portion 33, in other words, the upper edge of a pair of sidewall portions 31*b*, a pin placement portion 33*b* is formed by recessing a part of the corresponding upper edge of the pair of sidewall portions 31b so that the part is open upward. The pin placement portions 33b are shaped such that the boom foot pin 25 can be placed in the pin placement portions 33b. Specifically, the pin placement portions 33b have a curved shape formed along an outer peripheral surface of the boom foot pin 25 in the side view. Thus, when an installation or removal operation for the boom foot pin 25 is performed, the boom foot pin 25 can be temporarily placed in the pin placement portions 33b. As a result, workability is improved.

In the second embodiment, the pin placement portions 33b have a curved shape formed along the outer peripheral surface of the boom foot pin 25. However, the pin placement portion 33b may have any shape provided that the boom foot pin 25 can be placed in the pin placement portions 33b.

Other Embodiments

The present invention is not limited to the above-described embodiments but may adopt, for example, the following aspects.

In the present embodiments, the configuration has been described in which the hinge members 32 are attached to the upper end portion of the opening/closing lid 35 in a state where the opening/closing lid 35 closes the opening region 31a, thereby allowing the opening region 31a to be opened by raising the lower end portion of the opening/closing lid 35. However, the support mechanism for the opening/closing lid 35 is not limited to this configuration. For example, the hinge members 32 may be attached to a right end portion of the opening/closing lid 35 in a state where the opening/closing lid 35 closes the opening region 31a, thereby allowing the opening region 31a to be opened by raising a left end portion of the opening/closing lid 35. Alternatively, the hinge members 32 may be attached to the lower end portion of the opening/closing lid 35 in a state where the opening/closing lid 35 closes the opening region 31a, thereby allowing the opening region 31a to be opened by raising the upper end portion of the opening/closing lid 35.

Furthermore, in the present embodiments, the hinge attachment portion 31c is provided in the rear end portion of upper portion of the box main body 31, and the hinge attachment portion 31c of the box main body 31 and the base end portion of the opening/closing lid 35 are attached via the hinge members 32. However, the attachment position of the hinge members 32 is not limited to the above-described position.

Figure 9:
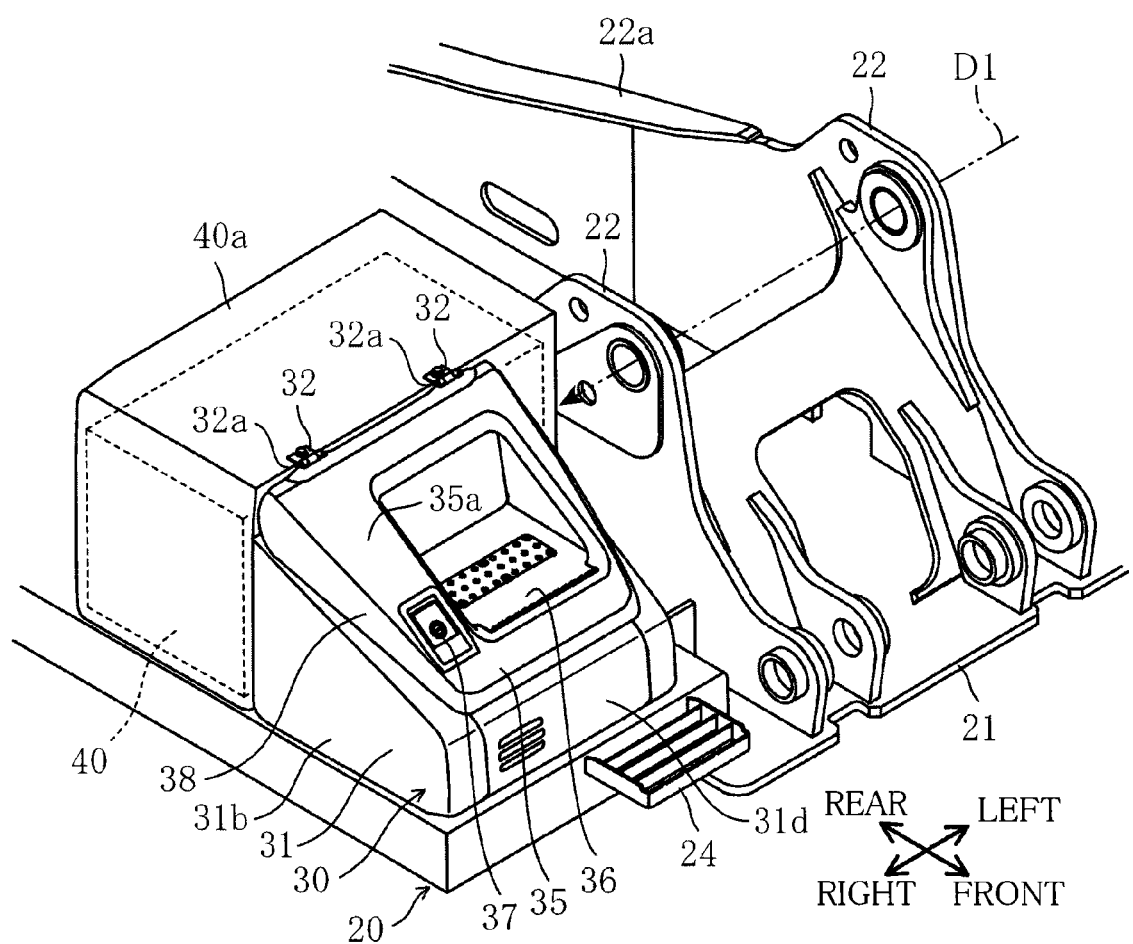
FIG. 9 is a perspective view illustrating a housing box according to a third embodiment of the present invention.

For example, as shown in a third embodiment in FIG. 9, the hinge members 32 may be attached to a front portion of the tank cover 40a of the reducing agent tank 40, and the tank cover 40a and the base end portion of the opening/closing lid 35 may be attached via the hinge members 32. In this case, the height of the attachment position of the hinge members 32 can be increased using the tank cover 40a without an increase in the height of rear portion of the box main body 31. Therefore, the third embodiment eliminates the need to provide the sidewall portions 31b of box main body 31 with a cutout shape and allows the box main body 31 to be shaped like a simple box. Thus, manufacturing costs can be suppressed.

Furthermore, in the first embodiment, the upper end portions of the pair of sidewall portions 31b of the box main body 31 are folded toward the inside of the box main body 31 with respect to the lower part of the upper end portion, and the recess portion 33a is formed at the upper end portion of each of the sidewall portions 31b. However, the formation position of the recess portion 33a is not limited to the above-described position. For example, the pair of sidewall portions 31b of the box main body 31 may extend upward without being folded toward the inside of the box main body 31, and the recess portion 33a may be formed at the upper end portion of each of the sidewall portions 31b.

Furthermore, in the above-described embodiment, the configuration has been described in which the opening region 31a of the box main body 31 is open upward, with the opening/closing lid 35 disposed so as to close the opening region 31a. However, the direction of the opening region 31a and the disposition of the opening/closing lid 35 are not limited to the above-described direction and disposition.

Figure 10:
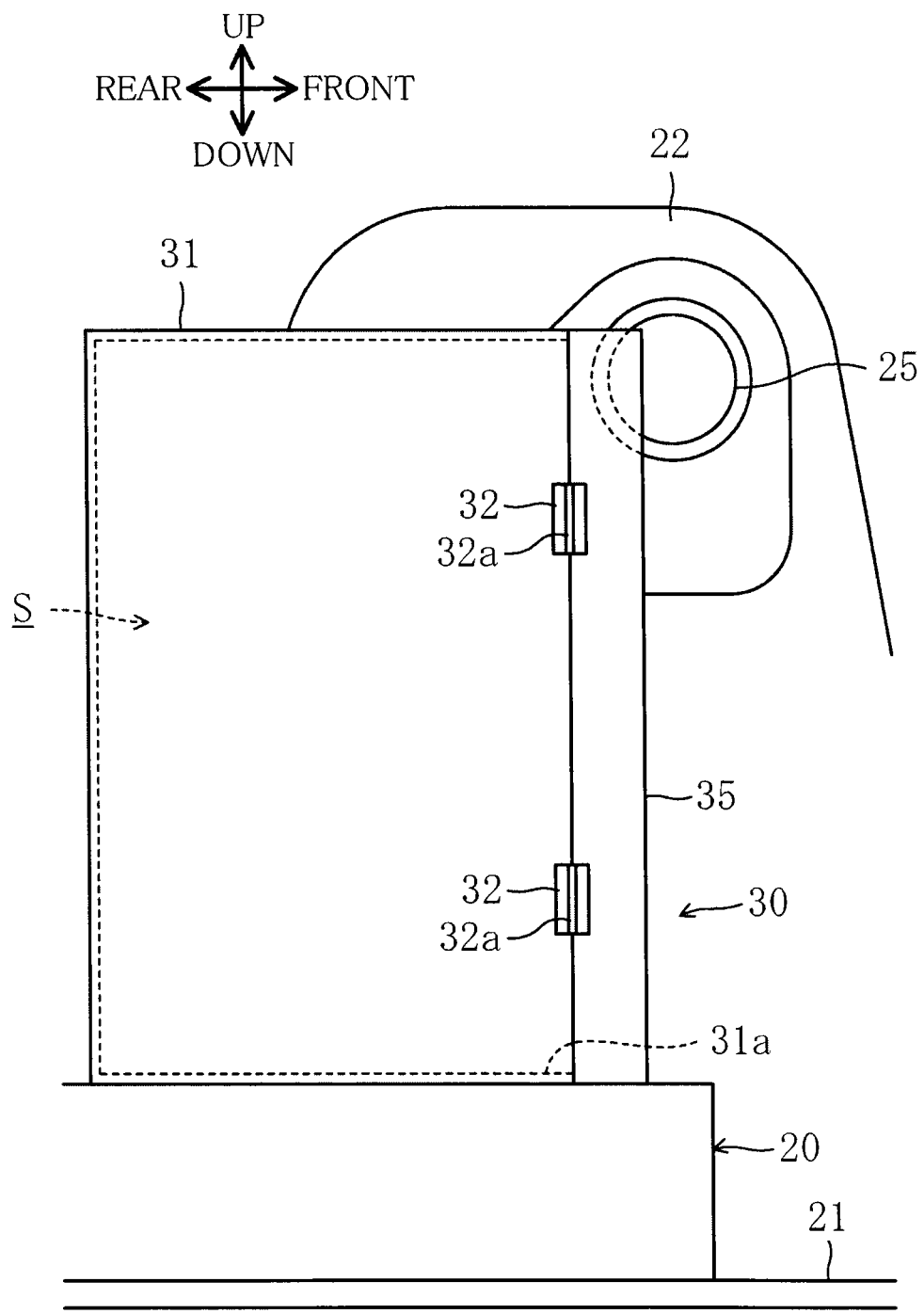
FIG. 10 is a side view illustrating a housing box according to a fourth embodiment of the present invention.

For example, as in a fourth embodiment depicted in FIG. 10, the opening region 31a of the box main body 31 may be open forward, and the opening/closing lid 35 may be attached to the box main body 31 so as to close the opening region 31a.

In the configuration shown in FIG. 10, the hinge members 32 are attached to the front portion of right side surface of the box main body 31. The base end portion of the opening/closing lid 35 is supported so as to be able to rotate around the rotating shafts 32a extending along the up-down direction of the hinge members 32. Specifically, the opening/closing lid 35 can be rotated between the closed position where the opening/closing lid 35 is placed in front of the box main body 31 to close the opening region 31a and the open position where the left end portion of the opening/closing lid 35 is pulled forward to place the opening/closing lid 35 on the right of the box main body 31 to open the opening region 31a.

When the opening/closing lid 35 is rotated to the closed position, the opening/closing lid 35 is placed at the position where the opening/closing lid 35 overlaps the boom foot pin 25 in the side view. On the other hand, when the opening/closing lid 35 is rotated to the open position, the opening/closing lid 35 opens the boom foot pin 25 in the axial direction D1 (rightward) in the side view.

Furthermore, in the fourth embodiment, the box main body 31 is disposed on the right of the right vertical plate 22 in a state where the boom foot pin 25 is placed opposite (in front of) the housing space S with reference to the opening region 31a in the side view, and is shaped to open the boom foot pin 25 in the axial direction D1.

The above-described specific embodiments mainly include an invention configured as described below.

To accomplish the above-described object, the present invention provides an upper slewing body to be provided on a lower traveling body of a construction machine so as to be able to slew, the upper slewing body including a bottom plate to be provided on the lower traveling body so as to be able to slew, a pair of vertical plates stood on the bottom plate and extending in a front-rear direction, the vertical plates being opposite to each other in a left-right direction, a boom foot pin attached to the pair of vertical plates so as to straddle the pair of vertical plates, the boom foot pin being attached to the pair of vertical plates so as to be able to be pulled out along an axial direction of the boom foot pin, a boom supported by the boom foot pin so as to be able to rotate with respect to the pair of vertical plates, and a housing box including: a box main body having a housing space formed inside, the housing space including an opening region so as to be open, the box main body allowing an object to be moved in and out of the housing space through the opening region; and an opening/closing lid configured to allow the opening region of the box main body to be opened and closed, wherein the box main body is disposed on a side of one of the pair of vertical plates opposite to the other vertical plate in a state where the boom foot pin is placed opposite the housing space with reference to the opening region in a side view in which the upper slewing body is viewed along the axial direction, and the box main body is shaped to open the boom foot pin in the axial direction, the opening/closing lid is attached to the box main body so as to be able to rotate with respect to the box main body between a closed position where the opening region is closed and an open position where the opening region is open, and the opening/closing lid is rotated to the closed position to lie at a position where the opening/closing lid overlaps the boom foot pin in the side view, and is rotated to the open position to lie at a position where the boom foot pin is opened in the axial direction.

According to the present invention, when the opening/closing lid closes the opening region of the box main body (the opening/closing lid is rotated to the closed position), the opening/closing lid overlaps the boom foot pin in the side view. This, in combination with utilization of a space in the opening/closing lid, allows a large housing space to be secured in the housing box. On the other hand, when the opening region of the box main body is opened (the opening/closing lid is rotated to the open position), the opening/closing lid and the box main body do not overlap the boom foot pin (the boom foot pin is opened in the axial direction) in the side view. A working space for lateral removal of the boom foot pin from the construction machine can be secured simply by rotating the opening/closing lid in an opening direction without removing a whole of the housing box from the upper slewing body. Thus, the workload can be reduced.

In the upper slewing body, preferably, a recess portion recessed in a direction away from the boom foot pin is formed at a boom foot-pin side edge in the side view.

According to this aspect, the recess portion is formed at the boom foot-pin side edge (the boom foot-pin side edge is closer to the boom foot pin in the side view) of the box main body. Thus, the boom foot pin can be opened in the axial direction. Consequently, a space for installation and removal of the boom foot pin can be secured while the volume of the box main body maintained in the areas other than the recess portion.

In the upper slewing body, preferably, the box main body includes an opening side end portion having an end surface in which the opening region is formed, and the opening/closing lid includes a lid sidewall portion that externally covers the opening side end portion when the opening/closing lid is rotated to the closed position.

According to this aspect, rotating the opening/closing lid to the closed position allows the opening side end portion of the box main body to be externally covered with the lid sidewall portion. This allows rainwater and the like to be restrained from entering the housing space and improves the esthetic aspect of the present configuration.

In the upper slewing body, the box main body includes a pair of sidewall portions that are opposite to each other in the left-right direction, a hinge attachment portion attached to the pair of sidewall portions so as to straddle upper end portions of rear portions of the pair of sidewall portions, and a hinge member which supports the opening/closing lid so as to allow the opening/closing lid to be rotated between the closed position and the open position and which is attached to the hinge attachment portion in a state where the center of rotating of the opening/closing lid is positioned in front of a rear end of the box main body. The opening region is formed between the upper edge portions of the pair of sidewall portions. The upper edge portions of the pair of sidewall portions each include a first portion extending downward from a front edge of the hinge attachment portion in the side view and a second portion extending forward from a lower end of the first portion in the side view. The box main body is disposed so that the boom foot pin is positioned in front of the first portion and above the second portion in the side view.

According to this aspect, the center of rotating of the opening/closing lid attached via the hinge members is positioned in front of the rear end of the box main body. Thus, for example, even when a decorative cover is stood behind the housing box, the opening/closing lid can be opened and closed while interference of the opening/closing lid with the cover is suppressed. Furthermore, when the hinge attachment portion and the decorative cover are designed to be continuous, the esthetic aspect of the present configuration is improved.

Moreover, the pair of sidewall portions of the box main body includes the first portion and the second portion, and the boom foot pin is positioned in front of the first portion and above the second portion in the side view. Thus, the space for installation and removal of the boom foot pin can be secured while the height of rear portion of the box main body maintained.

In the upper stewing body, preferably, the boom foot pin is provided above the box main body in the side view, the opening/closing lid is attached to the box main body so as to be able to rotate between the closed position where the opening/closing lid overlaps the boom foot pin in the side view and the open position to which the opening/closing lid is rotated upward from the closed position and where a part of the opening/closing lid is disposed above the boom foot pin in the side view, the housing box further includes a stay member attached to the box main body and the opening/closing lid to hold the opening/closing lid in the open position and to regulate upward rotating of the opening/closing lid beyond the open position, the stay member is removably attached to at least one of the box main body and the opening/closing lid, and the opening/closing lid is attached to the box main body so as to be able to be rotated to the position where the boom foot pin is opened upward in the side view, by removing the stay member from at least one of the box main body and the opening/closing lid.

According to this aspect, the stay member is removed from at least one of the box main body and the opening/closing lid to enable the opening/closing lid to be rotated to the position where the boom foot pin is opened upward in the side view. Thus, when the boom foot pin is conveyed by being hoisted by a hoisting member of a crane in order to allow an installation or removal operation for the boom foot pin to be performed, the opening/closing lid can be restrained from interfering with the hoisting member.

In the upper slewing body, preferably, the boom foot pin is provided above the box main body in the side view, and an upper edge of the box main body is provided with a pin placement portion which is formed by recessing a part of the upper edge of the box main body so that the part of the upper edge is open upward, and the pin placement portion being shaped such that the boom foot pin can be placed in the pin placement portion.

According to this aspect, the pin placement portion in which the boom foot pin can be placed are formed at the upper edge of the box main body. Thus, when an installation or removal operation for the boom foot pin is performed, the boom foot pin can be temporarily placed in the pin placement portion.

In the upper slewing body, preferably, the opening/closing lid has an inclined surface that is inclined with respect to a horizontal plane and faces upward when the opening/closing lid is rotated to the closed position, and a step portion formed by recessing a part of the inclined surface toward the housing space side so as to allow an operator to get on and off from the upper slewing body.

According to this aspect, the step portion recessed toward the housing space side is formed in the inclined surface of the opening/closing lid which faces upward. Thus, the step portion that allows the operator to get on and off from the upper slewing body is formed in an upper space in the housing space of the box main body, the upper space in the housing space corresponding to a dead space. Therefore, the dead space can be effectively utilized.

As described above, the present invention exerts a practical effect that enables provision of a working space for installing and removing the boom foot pin without removal of the housing box from the upper slewing body, by improving the configuration of the housing box. Thus, the present invention is very useful and achieves high industrial applicability.

This application is based on Japanese Patent application No. 2014-006500 filed in Japan Patent Office on Jan. 17, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An upper slewing body to be provided on a lower traveling body of a construction machine so as to be able to slew, the upper slewing body comprising:
   a bottom plate to be provided on the lower traveling body so as to be able to slew;
   a pair of vertical plates standing on the bottom plate and extending in a front-rear direction, the vertical plates being opposite to each other in a left-right direction;
   a boom foot pin attached to the pair of vertical plates so as to straddle the pair of vertical plates, the boom foot pin being attached to the pair of vertical plates so as to be able to be pulled out along an axial direction of the boom foot pin;
   a boom supported by the boom foot pin so as to be able to rotate with respect to the pair of vertical plates; and
   a housing box including: a box main body having a housing space formed inside, the housing space including an opening region so as to be open, the box main body allowing an object to be moved in and out of the housing space through the opening region; and an opening/closing lid configured to allow the opening region of the box main body to be opened and closed,
   wherein the box main body is disposed on a side of one of the pair of vertical plates opposite to the other vertical plate in a state where the boom foot pin is placed opposite the housing space with reference to the opening region in a side view in which the upper slewing body is viewed along the axial direction, and the box main body is shaped to open the boom foot pin in the axial direction,
   the opening/closing lid is attached to the box main body so as to be able to rotate with respect to the box main body between a closed position where the opening region is closed and an open position where the opening region is open, and
   the opening/closing lid is rotated to the closed position to lie at a position where the opening/closing lid overlaps the boom foot pin in the side view, and is rotated to the open position to lie at a position where the boom foot pin is opened in the axial direction.

2. The upper slewing body according to claim 1,
   wherein a recess portion recessed in a direction away from the boom foot pin is formed at a boom foot-pin side edge of the box main body in the side view.

3. The upper slewing body according to claim 1,
   wherein the box main body includes an opening side end portion having an end surface in which the opening region is formed, and
   the opening/closing lid includes a lid sidewall portion that externally covers the opening side end portion when the opening/closing lid is rotated to the closed position.

4. The upper slewing body according to claim 1,
   wherein the box main body includes a pair of sidewall portions that are opposite to each other in the left-right direction, a hinge attachment portion attached to the pair of sidewall portions so as to straddle upper end portions of rear portions of the pair of sidewall portions, and a hinge member which supports the opening/closing lid so as to allow the opening/closing lid to be rotated between the closed position and the open position and which is attached to the hinge attachment portion in a state where the center of rotating of the opening/closing lid is positioned in front of a rear end of the box main body,
   the opening region is formed between the upper edge portions of the pair of sidewall portions,
   the upper edge portions of the pair of sidewall portions each include a first portion extending downward from a front edge of the hinge attachment portion in the side view and a second portion extending forward from a lower end of the first portion in the side view, and
   the box main body is disposed so that the boom foot pin is positioned in front of the first portion and above the second portion in the side view.

5. The upper slewing body according to claim 1,
   wherein the boom foot pin is provided above the box main body in the side view,
   the opening/closing lid is attached to the box main body so as to be able to rotate between the closed position where the opening/closing lid overlaps the boom foot pin in the side view and the open position to which the opening/closing lid is rotated upward from the closed position and where a part of the opening/closing lid is disposed above the boom foot pin in the side view,
   the housing box further includes a stay member attached to the box main body and the opening/closing lid to hold the opening/closing lid in the open position and to regulate upward rotating of the opening/closing lid beyond the open position,
   the stay member is removably attached to at least one of the box main body and the opening/closing lid, and
   the opening/closing lid is attached to the box main body so as to be able to be rotated to the position where the boom foot pin is opened upward in the side view, by removing the stay member from at least one of the box main body and the opening/closing lid.

6. The upper slewing body according to claim 1,
   wherein the boom foot pin is provided above the box main body in the side view, and
   an upper edge of the box main body is provided with a pin placement portion which is formed by recessing a part of the upper edge of the box main body so that the part of the upper edge is open upward, and the pin placement portion being shaped such that the boom foot pin can be placed in the pin placement portion.

7. The upper slewing body according to claim 1,
   wherein the opening/closing lid has an inclined surface that is inclined with respect to a horizontal plane and faces upward when the opening/closing lid is rotated to the closed position, and a step portion formed by recessing a part of the inclined surface toward the housing space side so as to allow an operator to get on and off from the upper slewing body.

* * * * *